US010524069B1

(12) United States Patent
Pogue

(10) Patent No.: US 10,524,069 B1
(45) Date of Patent: Dec. 31, 2019

(54) SYSTEM FOR CONFIGURING DISTRIBUTION OF AUDIO DATA TO DEVICES BASED ON CONNECTION STATUS

(71) Applicant: AMAZON TECHNOLOGIES, INC, Seattle, WA (US)

(72) Inventor: Michael Alan Pogue, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 270 days.

(21) Appl. No.: 15/387,158

(22) Filed: Dec. 21, 2016

(51) Int. Cl.
| | |
|---|---|
| *H04R 27/00* | (2006.01) |
| *H04W 24/08* | (2009.01) |
| *H04R 29/00* | (2006.01) |
| *H04W 4/80* | (2018.01) |
| *H04W 76/40* | (2018.01) |
| *H04N 21/442* | (2011.01) |
| *G06F 3/16* | (2006.01) |
| *H04W 40/12* | (2009.01) |
| *H04W 40/04* | (2009.01) |
| *H04L 29/06* | (2006.01) |

(Continued)

(52) U.S. Cl.
CPC ............ *H04R 27/00* (2013.01); *G06F 3/165* (2013.01); *H04N 21/44227* (2013.01); *H04R 29/007* (2013.01); *H04W 4/80* (2018.02); *H04W 24/08* (2013.01); *H04W 40/04* (2013.01); *H04W 40/12* (2013.01); *H04W 76/40* (2018.02); *H04B 17/318* (2015.01); *H04L 65/4069* (2013.01); *H04L 65/4076* (2013.01); *H04N 21/43615* (2013.01); *H04R 2227/003* (2013.01); *H04R 2227/005* (2013.01); *H04R 2420/07* (2013.01)

(58) Field of Classification Search
CPC ........ G06F 3/165; G06F 9/5044; G06F 9/505; H04N 21/43615; H04N 21/44227; H04R 3/12; H04R 27/00; H04R 29/007; H04R 2227/005; H04R 2227/003; H04R 2420/07; H04L 1/0001; H04L 43/08; H04L 65/4069; H04L 65/4076; H04B 17/318; H04W 4/80; H04W 24/08; H04W 40/04; H04W 40/06; H04W 40/08; H04W 40/10; H04W 40/12; H04W 76/40
USPC ........................................ 700/94; 381/77, 79
See application file for complete search history.

(56) References Cited

U.S. PATENT DOCUMENTS 8,903,526 B2 * 12/2014 Beckhardt ............... G06F 3/165
  700/94
9,078,072 B2 * 7/2015 Sundaresan ............ H04R 29/00
(Continued)

*Primary Examiner* — Jesse A Elbin
(74) *Attorney, Agent, or Firm* — Lindauer Law, PLLC

(57) ABSTRACT

Described are techniques for configuring a group of audio devices to distribute audio data based on the communications undertaken by the audio devices. Audio devices that are not currently exchanging data via a communication link with an external device may be prioritized for use as a master device over other audio devices that may consume airtime or other resources performing such communications. Audio devices that lack communication links with external devices may be prioritized for use as a master device over other audio devices that maintain such communication links. If the communication links associated with a current master device or other audio devices change, a different master device may be automatically selected.

20 Claims, 6 Drawing Sheets

(51) Int. Cl.
*H04B 17/318* (2015.01)
*H04N 21/436* (2011.01)

(56) References Cited

U.S. PATENT DOCUMENTS

| | | | | |
|---|---|---|---|---|
| 2011/0158441 A1* | 6/2011 | Batra | ............. | H04R 1/1091 |
| | | | | 381/311 |
| 2012/0271902 A1* | 10/2012 | Baliga | ............. | H04L 43/0811 |
| | | | | 709/209 |
| 2015/0092947 A1* | 4/2015 | Gossain | ............. | G11B 27/002 |
| | | | | 381/58 |
| 2017/0019197 A1* | 1/2017 | Rajapakse | ............. | H04H 20/18 |

\* cited by examiner

SYSTEM FOR CONFIGURING DISTRIBUTION OF AUDIO DATA TO DEVICES BASED ON CONNECTION STATUS

BACKGROUND

When configuring a group of networked audio devices to provide a synchronized audio output, the characteristics of the devices may constrain and the manner in which certain devices may be used to distribute audio data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
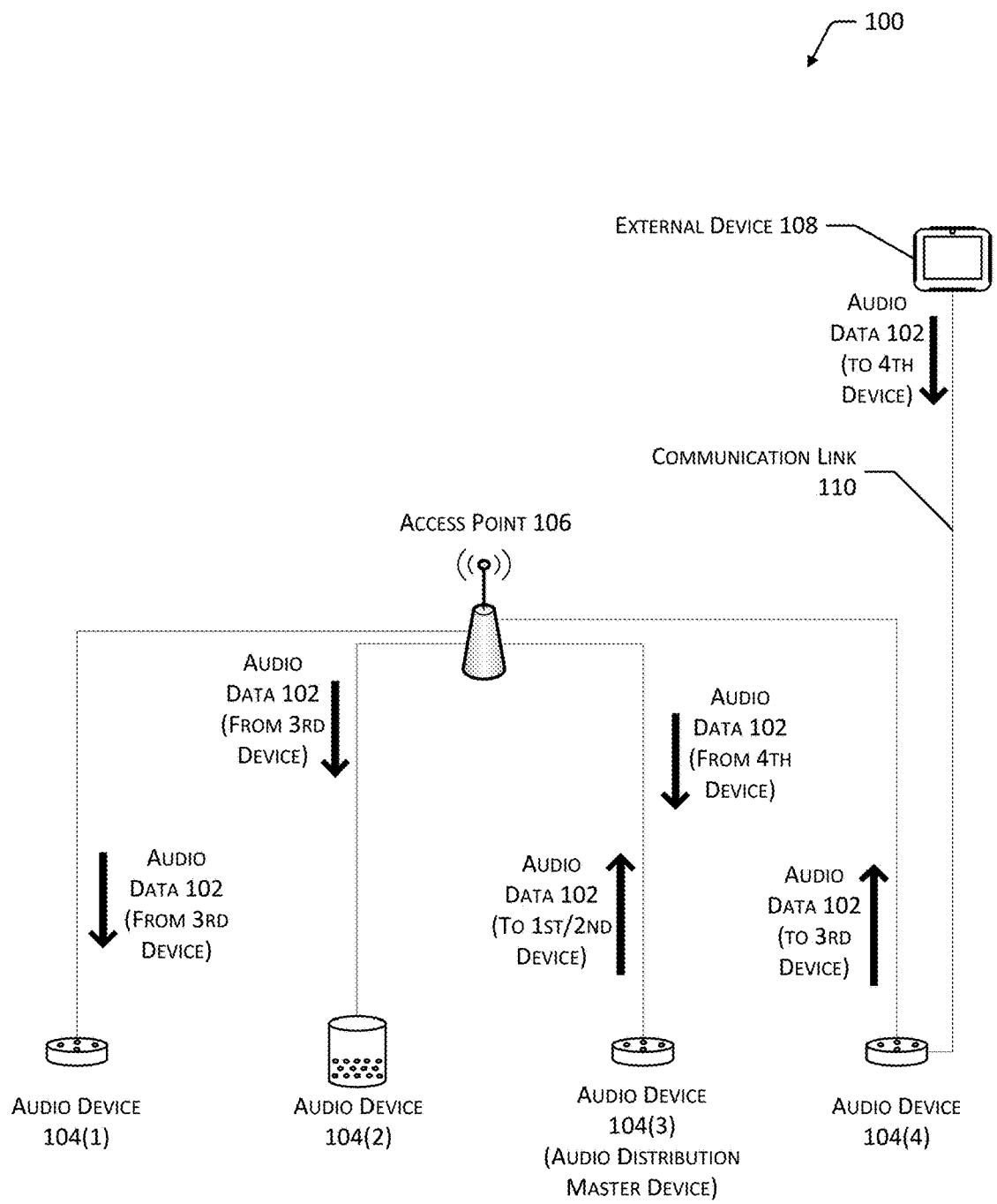
FIG. 1 depicts an implementation of a system for configuring the manner in which audio data is distributed by a group of audio devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, such as networked speakers, in communication with one another via one or more networks, which may be used to provide a synchronized audio output to users within an environment. For example, multiple audio devices, access points, and other devices may communicate using a Wi-Fi protocol that corresponds at least in part to section 802.11 of the specifications set forth by the Institute of Electrical and Electronics Engineers (IEEE). In some cases, a user may select a particular group of audio devices to be used, such as a set of audio devices within a particular room of a home, or all of the audio devices located on a particular floor of the home. The user may also select a particular audio application for use or particular audio content for output. Based on the location and other characteristics of each audio device, the timing and volume of the audio output for each audio device may be configured. For example, a time delay between various audio streams provided to different devices may be used to synchronize the audio output. As another example, different devices may be used to provide audio output at different volumes based on distance from a listening position, different channels of a surround-sound output, and so forth.

However, the number of audio devices that may be used to generate an audio output, the particular audio devices that may be used, and the quality of the audio output may be affected by characteristics of the network(s) by which the audio devices communicate, and by characteristics of the devices themselves. For example, audio devices having wireless radios that are capable of communicating using both Wi-Fi and Bluetooth protocols may be constrained by limited airtime when simultaneously exchanging data using both protocols. Airtime may include the time used by a device to transmit and receive data, which may be measured in frames or units of time. The airtime used by a device may be affected by the characteristics of the device, the characteristics of the other device with which it communicates, the distance between the devices, the presence of objects between the devices, and so forth. In some cases, a device that is receiving data via a Bluetooth communication link may utilize up to seventy-five percent of the airtime associated with the wireless radio. Use of the Bluetooth communication link may therefore constrain the ability of the device to also exchange data with access points or other devices using a Wi-Fi connection. This may be especially apparent during times when a Wi-Fi network is congested or affected by noise, or if a device is positioned a significant distance from a wireless access point. If the airtime used by a device exceeds its available airtime, attempts to provide an audio output using the group of audio devices may fail, or irregularities in the audio output, such as audio stuttering, may be observed.

Described in this disclosure are techniques for distributing audio data to a group of audio devices in communication with a wireless access point in a manner that accounts for limitations associated with the devices, such as the use of one or more devices to communicate data using other communication protocols, such as Bluetooth. To produce a synchronized audio output using a group of audio devices, audio data may be provided by a source to a single audio device within the group. In some implementations, the source of the audio data may include a remote data source, such as a content server that provides the audio data to an audio device via a communication link with a wireless access point. In other implementations, the source of the audio data may include a local data source, such as a smartphone, tablet computer, media server, or other computing device proximate to the audio devices that may provide the audio data to the audio devices via a Bluetooth communication link.

Once the audio data has been received by an audio device, it may be distributed to the other audio devices in the group by a particular audio device, designated as a master audio device. In some cases, the audio device that receives the audio data from the source may function as the master audio device. However, in other cases, the audio device that receives the audio data may not be suitable for use as the master audio device. For example, if a particular audio device receives the audio data via a Bluetooth communication, this may utilize a significant portion of the airtime associated with the wireless radio of the particular audio device. In such cases, the particular audio device may lack sufficient resources to then provide the audio data to each other audio device within the group. Instead, a different audio device within the group may be designated as the master audio device, which may receive the audio data from the particular audio device, then distribute the audio data to the other devices within the group.

In some cases, the master audio device may distribute the audio data to one or more audio devices via a local access point. Example implementations for forming a group of audio devices associated with an access point are described in U.S. patent application Ser. No. 15/245,897, filed Aug. 24, 2016, entitled "System for Configuring Distributed Audio Output Using an Access Point", which is incorporated by reference herein in its entirety. In other cases, the master audio device may distribute the audio data to multiple audio devices simultaneously via a multicast transmission. Example implementations for forming a group of audio devices in which a master device distributes audio data to multiple slave devices via a multicast transmission are described in U.S. patent application Ser. No. 15/246,070, filed Aug. 24, 2016, entitled "System for Configuring Distributed Audio Output Using a Designated Audio Device", which is incorporated by reference herein in its entirety. A group of audio devices may also use a combination of multicast transmissions and communication via an access point to distribute audio data. Example implementations for distributing data to generate an audio output using multiple devices are described in U.S. patent application Ser. No. 15/357,579, filed Nov. 21, 2016, entitled "System for Distributing Audio Output Using Multiple Devices", which is incorporated by reference herein in its entirety. Example implementations for distributing audio data using both multicast transmissions and transmissions via an access point are described in U.S. patent application Ser. No. 15/373,677, filed Dec. 9, 2016, entitled "System for Configuring Audio Devices to Distribute Audio Data", which is incorporated by reference herein in its entirety.

To determine a particular audio device within a group to be used as the master audio device, signal quality data may be obtained from at least a portion of the audio devices. Signal quality data may include one or more measurements of the strength or quality of the communications exchanged between various audio devices, and between the audio devices and an access point. For example, signal quality data for a particular audio device may include received signal strength indications (RSSI) associated with communications between that audio device and the access point, and between that audio device and one or more other audio devices. Signal quality data may also include other indications of the strength or other attributes of such communications, such as a signal-to-noise ratio (SNR), packet error rate (PER), data throughput or physical data rate, modulation and coding scheme (MCS), bit rate, and so forth. In some implementations, the signal quality data may be determined periodically, and a moving average for one or more signal quality values may be determined. For example, an audio device having high data throughput rates for transmissions to other audio devices may be more suitable for use as a master audio device than an audio device having a low data throughput rate. In other implementations, the signal quality data may include a communication history, such as historical signal quality data, which may include an indication of previous packet error rates, instances of audio stutter, and so forth.

The master audio device may also be determined based on device data. Device data for a particular audio device may indicate various characteristics about the device, such as characteristics of a wireless radio or antenna thereof. For example, an audio device having multiple wireless radios or a wireless radio that does not share airtime between Wi-Fi and Bluetooth protocols may be more suitable for use as a master audio device than an audio device having a wireless radio that shares airtime between Wi-Fi and Bluetooth communications. Device data may also indicate whether an audio device is capable of Wi-Fi communications in 2.4 or 5 Gigahertz bands. Device data may further indicate whether an audio device is capable of transmitting or receiving audio data via a multicast transmission. For example, an audio device that may transmit audio data to multiple other devices using a single multicast transmission may be more suitable for use as a master audio device than an audio device that lacks a multicast transmitter and provides audio data to other devices through individual transmissions to each receiving device via an access point.

The master audio device may additionally be determined based on communication data. Communication data for a particular audio device may indicate the communication links maintained by the audio device with other devices and the state of at least a portion of the communication links. For example, an audio device may maintain one or more Bluetooth communication links with other devices. States of a Bluetooth communication link may include an active exchange of data, devices that are paired but not exchanging data, devices that are paired but out of range, devices that are not paired, and devices that are not capable of initiating Bluetooth communication links. Continuing the example, an audio device may be paired with a remote controller that may provide control commands to the audio device via a Bluetooth communication link. As another example, an audio device may be paired with a smartphone or other type of computing device that may provide audio data or other content to the audio device via a Bluetooth communication link. During times when a Bluetooth communication link is actively communicating data between the audio device and another device, a significant portion of the airtime available to the audio device may be consumed. When an audio device is paired with another device but no data is currently being exchanged, this airtime may not be consumed, however, the potential for a Bluetooth communication to be initiated with a paired device may remain, which would similarly consume airtime. When an audio device is paired with another device that is not currently present in an environment (e.g., within range of the audio device), the potential for initiation of a Bluetooth communication does not exist, unless the paired device is moved into proximity of the audio device. When an audio device is not paired with another device, the potential for initiation of a Bluetooth communication does not exist, unless another device is paired with the audio device. If an audio device is not capable of communicating via Bluetooth communication links, no potential for consumption of airtime via Bluetooth communications would exist. Therefore, audio devices that are not currently paired with other devices would be more suitable for use as a master audio device than audio devices that are paired with other devices. Audio devices that are paired with other devices would be more suitable for use as a master audio device than audio devices that are currently exchanging data via a Bluetooth communication link.

In some cases, the master audio device of a group of audio devices may be changed based on a change in communication data. For example, if an audio device that is paired with a remote controller or smartphone begins receiving data via a Bluetooth communication link, the consumption of airtime associated with this communication may cause the audio device to be less suitable for use as a master audio device. As a result, another audio device may begin to function as the master audio device. As another example, if an audio device that does not include any Bluetooth communication links is paired with a tablet computer, the initiation of this communication link may create the potential for the consumption of airtime through communications with the tablet computer. As a result, another audio device that is not paired with other devices may begin to function as the master audio device. The master audio device may also be changed based on changes in the signal data. For example, if an audio device is moved, a network becomes congested or affected by noise, or other objects are positioned proximate to an audio device that reduce signal quality values associated therewith, the audio device may become unsuitable for use as a master audio device. In such cases, another audio device may begin to function as the master audio device.

FIG. 1 depicts an implementation of a system 100 for configuring the manner in which audio data 102 is distributed by a group of audio devices 104. In the example system 100 of FIG. 1, four audio devices 104 are shown, each in communication with a wireless access point 106. For example, each audio device 104 may communicate via one or more networks using a Wi-Fi protocol that corresponds at least in part to section 802.11 of the specifications set forth by the Institute of Electrical and Electronics Engineers (IEEE). In other implementations, the audio devices 104 may communicate using other protocols or types of networks including, without limitation, Ethernet, Wi-Fi Direct, Bluetooth, Bluetooth Low Energy, ZigBee, Z-Wave, 3G, 4G, LTE, and so forth. The audio devices 104 may include any type of computing device capable of generating an audio output including, without limitation, a smartphone, a tablet computer, a personal computer, a wearable computer, an automotive computer, a networked speaker, a television, and so forth. In some implementations, one or more of the audio devices 104 may include different types of devices. For example, FIG. 1 depicts the first audio device 104(1), the third audio device 104(3), and the fourth audio device 104(4) as a first type of wireless networked speaker, while the second audio device 104(2) is pictured as a second type of wireless networked speaker.

To generate a synchronized audio output using the audio devices 104, audio data 102 may be provided to each of the audio devices 104. In some implementations, the audio data 102 may be stored in a data storage medium associated with one or more of the audio devices 104. In other implementations, the audio data 102 may be provided to at least one of the audio devices 104 from an external source, such as a content server in communication with the access point 106. In still other implementations, the audio data 102 may be provided to at least one of the audio devices 104 from an external device 108 that communicates directly with the audio device(s) 104, such as via a Bluetooth communication link 110, or a communication link 110 associated with another type of protocol or communication. For example, FIG. 1 depicts an example external device 108, such as a tablet computer, providing audio data 102 to the fourth audio device 104(4) via a communication link 110.

Once the audio data 102 has been received by at least one of the audio devices 104, it may be distributed to the other audio devices 104. In some cases, a particular audio device 104, designated as an audio distribution master device ("master device"), may provide the audio data 102 to at least a portion of the other audio devices 104. For example, as described in application Ser. No. 15/245,897, incorporated by reference previously, a master device may provide audio data 102 to other audio devices 104 via one or more access points 106. In other cases, as described in application Ser. No. 15/246,070, incorporated by reference previously, a master device may provide audio data 102 to other audio devices 104 via one or more multicast transmissions.

In some implementations, receipt of the audio data 102 via a Bluetooth communication link 110 may consume a significant portion of the airtime or other resources associated with the fourth audio device 104(4). In such cases, distribution of the audio data 102 to each of the other audio devices 104 by the fourth audio device 104(4) may exceed the remaining resources available to the fourth audio device 104(4). This situation may be especially likely to occur in systems 100 where a large number of audio devices 104 are used, during times when the network associated with the access point 106 is congested or affected by noise, or if the fourth audio device 104(4) is positioned a significant distance from the access point 106. Therefore, while the audio data 102 may be initially received by the fourth audio device 104(4), the fourth audio device 104(4) may not be suitable for use as an audio distribution master device due to the constrained resources of the fourth audio device 104(4) caused by the exchange of data using the communication link 110.

Instead, another of the audio devices 104(3) may be selected for use as a master device. For example, signal quality data indicative of the strength or other characteristics of communications between various audio devices 104 and the access point 106 may be determined. Continuing the example, the signal quality data may correspond to the time and computational resources that would be used by a particular audio device 104 to distribute audio data 102 as a master device. Device data indicative of the type or characteristics of one or more of the audio devices 104 may also be determined. For example, particular characteristics of the wireless radio or antenna of an audio device 104 may affect the time and computational resources that would be used by the audio device 104, the capacity of resources available to the audio device 104, and so forth. Communication data associated with one or more of the audio devices 104 may also be determined. For example, if a particular audio device 104, such as the fourth audio device 104(4), is currently exchanging data with an external device 108 via a communication link 110, the communication data may indicate the use of the communication link 110, which may indicate that the resources available to the fourth audio device 104(4) are constrained. The communication data may also indicate whether particular audio devices 104 are paired or otherwise maintain communication links 110 with other devices. Based on one or more of the signal quality data, the device data, and the communication data, a particular audio device 104 may be designated as the audio distribution master device.

For example, due to the fact that the fourth audio device 104(4) is actively exchanging data with the external device 108 via the communication link 110, the fourth audio device 104(4) may be unsuitable for use as a master device. Instead, FIG. 1 depicts the third audio device 104(3) as an audio distribution master device for the depicted network. Thus, rather than providing the audio data 102 to each of the audio devices 104, which may exceed the resources available to the fourth audio device 104(4), the fourth audio device 104(4) may provide the audio data 102 to the third audio device 104(3). The third audio device 104(3) may in turn distribute the audio data 102 to the first audio device 104(1) and the second audio device 104(2) via the access point 106. In other implementations, the third audio device 104(3) may be configured to provide the audio data 102 to multiple audio devices 104 via a single multicast transmission.

Figure 2:
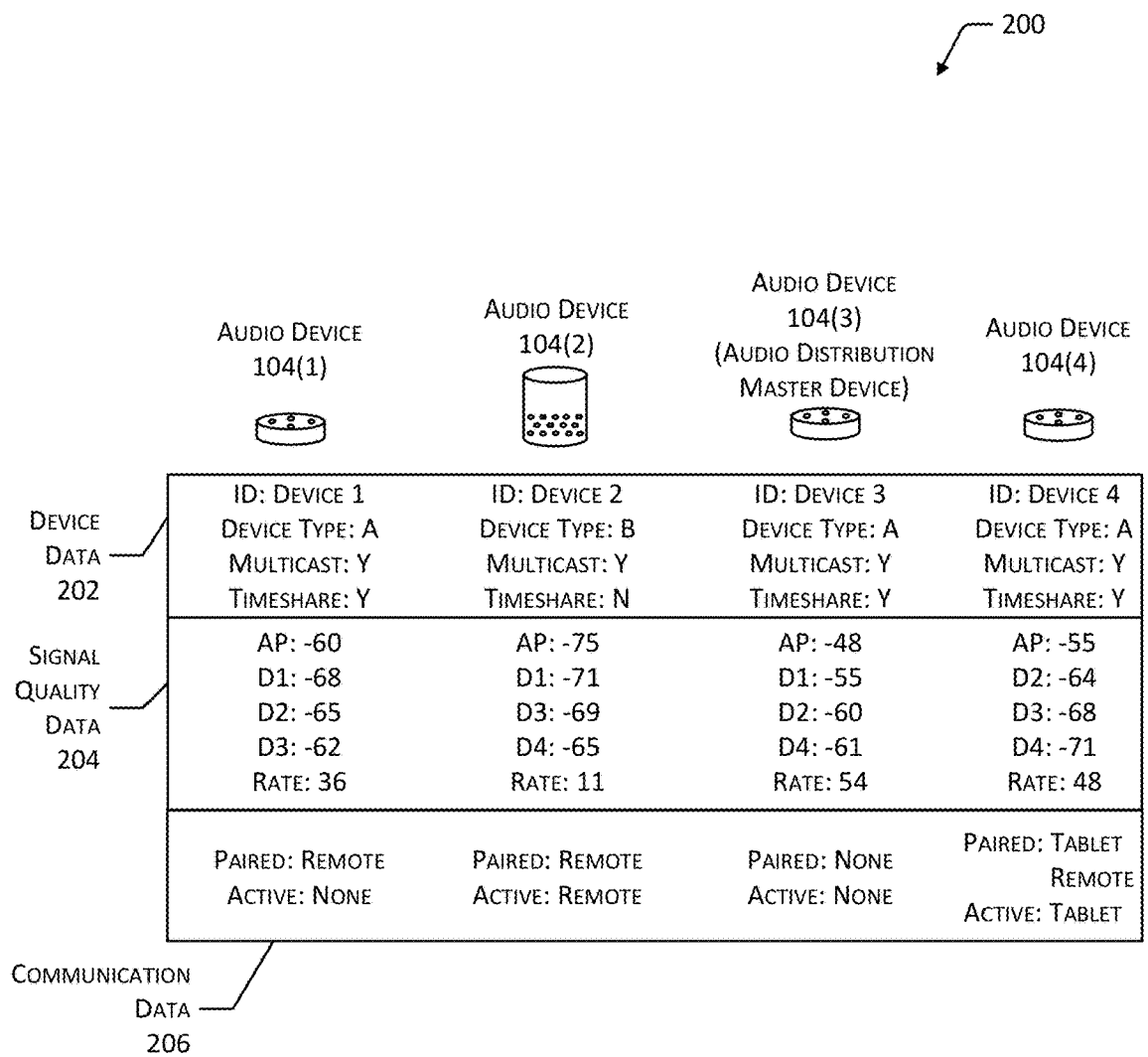
FIG. 2 is a block diagram depicting example device data, signal quality data, and communication data associated with a group of audio devices.

FIG. 2 is a block diagram 200 depicting example device data 202, signal quality data 204, and communication data 206 associated with a group of audio devices 104. The device data 202, signal quality data 204, and communication data 206 may be used to determine a particular audio device 104 within the group of audio devices 104 that may function as an audio distribution master device with greater efficiency or effectiveness than one or more other audio devices 104 within the group.

Device data 202 for a particular audio device 104 may include characteristics of the physical hardware or other components of the audio device 104, software or audio applications associated with the audio device 104, and so forth. For example, device data 202 may include a device identifier associated with the audio device 104. A device identifier may include a device name, serial number, or other alphanumeric string that may be used to differentiate a particular audio device 104 from other audio devices 104. In some implementations, a device identifier may include a Media Access Control (MAC) address or a network address associated with an audio device 104. In other implementations, a device identifier may include other types of data in addition to or in place of alphanumeric data, such as audio data, image data, haptic data, and so forth.

Device data 202 may also include an indication of a device type associated with an audio device 104. In some implementations, a device type may be indicative of hardware or software components associated with the audio device 104. For example, device type "A" may include a particular type of wireless radio and antenna, while device type "B" may include a different type of wireless radio and antenna having different characteristics. In some cases, the device data 202 may further include an indication regarding whether an audio device 104 may transmit or receive data via multicast transmissions. For example, an audio device 104 that is configured to provide audio data 102 to multiple receiving audio devices 104 using a single multicast transmission may be prioritized as a master device over an audio device 104 that is restricted to providing multiple individual copies of the audio data 102 to individual audio devices 104 via an access point 106. Device data 202 may also include an indication regarding whether the wireless radio associated with a respective audio device 104 performs timesharing or coexistence functions regarding both Wi-Fi and Bluetooth communications, or other types of communications. For example, if an audio device 104 includes two wireless radios or a wireless radio that does not timeshare communications between two different protocols, the audio device 104 may be prioritized as a master device over an audio device 104 that may consume a large quantity of available airtime for communications using an alternate protocol.

Device data 202 may also include other indications of the capabilities, hardware, software, or other functionality of one or more audio devices 104. For example, device data 202 may include an indication regarding whether an audio device 104 may communicate using a 2.4 Ghz or 5 Ghz wireless band, particular audio applications executing on the audio device 104, a range or location associated with the audio device 104, and so forth.

Signal quality data 204 for a particular audio device 104 may include an indication of the strength or other characteristics of communications between the particular audio device 104 and an access point 106, and between the particular audio device 104 and one or more other audio devices 104. For example, signal quality data 204 may include an RSSI value for communications between a particular audio device 104 and other devices. The signal quality data 204 may also include one or more indications of a bit rate or MCS value for the particular audio device 104. For example, a bit rate may be determined based on an RSSI value. In other implementations, one or more bit rates may be determined by exchanging data between one or more audio devices 104 or access points 106. The quantity of data that is exchanged during a particular period of time may be used to calculate the bit rates for one or more of the audio devices 104. In some implementations, signal quality data 204 may include other indications of the strength or quality of a signal, such as an SNR value, a PER, a data throughput or physical data rate, an airtime utilization value, and so forth. In some implementations, the signal quality data 204 may include one or more average values. For example, signal quality data 204 may include an average RSSI, data throughput, or other measurement over a period of time. Continuing the example, signal quality data 204 may include one or more moving average values, such as a mean value determined from the ten most recent RSSI measurements between two audio devices 104. In some cases, the signal quality data 204 may include historic signal measurements, such as one or more previous error rates, instances of stuttering, increases or decreases in signal strength, and so forth. For example, a communication history indicative of historic signal measurements may be used to determine times of day when a particular audio device 104 may be prioritized for use as a master device, and other times of day when the particular audio device 104 may not be suitable for use as a master device.

Communication data 206 for an audio device 104 may include an indication of one or more other devices that maintain communication links 110 with the audio device 104, as well as the status of the communication links 110. For example, a particular audio device 104 that is unable to form a Bluetooth communication link 110 with an external device 108 may not be affected by the use of airtime or other network or computational resources, such as processor cycles, that may be consumed via Bluetooth communications. As a result, the particular audio device 104 may be more suitable for use as a master device than another audio device 104 that is capable of forming communication links 110 with external devices 108. As another example, a different audio device 104 that is able to initiate Bluetooth communication links 110 with other devices but with which no communication links 110 currently exist may be more suitable for use as a master device than audio devices 104 that currently maintain a communication link 110 with an external device 108, such as by pairing the audio devices 104 with a Bluetooth device. An audio device 104 that is currently paired with an external device 108 that is out of range, deactivated, or otherwise unable to be detected by the audio device 104 may be prioritized for use as a master device over an audio device 104 that is paired with an external device 108 and is able to detect the presence of the paired external device 108. An audio device 104 that is currently paired with an external device 108 that is detectable and within range, but not currently exchanging data with the external device 108 via a communication link 110 may be prioritized for use as a master device over an audio device 104 that is currently exchanging data via a communication link 110. For example, an audio device 104 that is exchanging data via a Bluetooth communication link 110 may utilize up to seventy-five percent of the airtime available to the audio device 104, which may significantly constrain the abilities of the audio device 104 to transmit audio data 102 to other audio devices 104.

Figure 3:
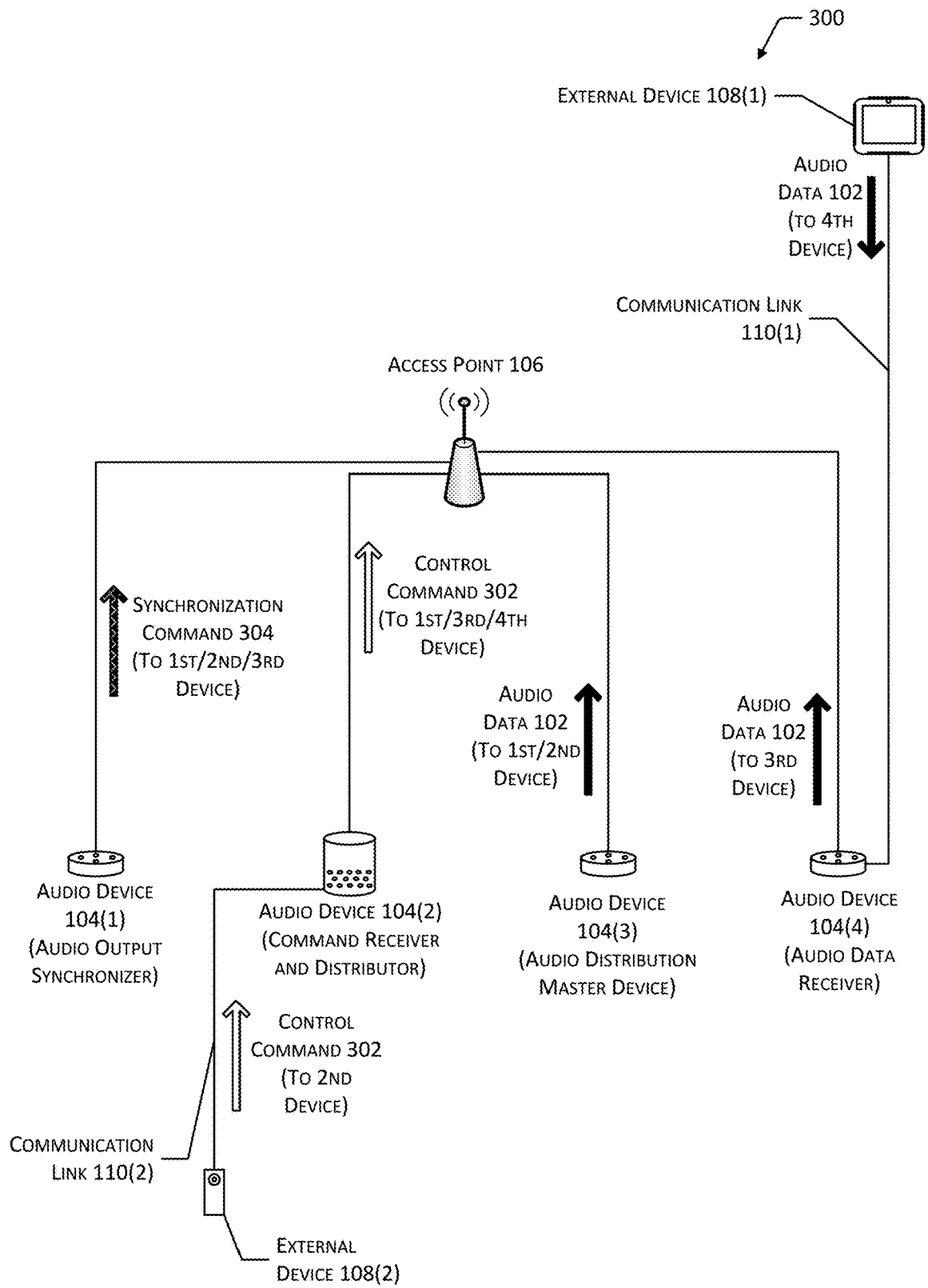
FIG. 3 depicts an implementation of a system for distributing audio data and commands between a group of audio devices.

FIG. 3 depicts an implementation of a system 300 for distributing audio data 102 and commands between a group of audio devices 104. The example system 300 includes four audio devices 104, each of which may be in communication with an access point 106, such as via one or more Wi-Fi networks. While FIG. 3 depicts a single access point 106, other implementations may include use of multiple access points 106 in communication with one another. FIG. 3 also depicts two example external devices 108, each of which may communicate with one or more of the audio devices 104 via one or more communication links 110. For example, the first external device 108(1) may include a tablet computer, a smartphone, or another type of computing device configured to provide audio data 102, via a Bluetooth communication link 110, to one or more of the audio devices 104. Continuing the example, the second external device 108(2) may include a remote control device or another type of computing device configured to provide control commands 302 to one of the audio devices 104 via a Bluetooth communication link 110. For example, a remote control device may communicate with an audio device 104 using a Bluetooth Low Energy protocol.

In some cases, one or more of the audio devices 104 may perform particular sets of computing functions related to generating an audio output. For example, the first audio device 104(1) may function as an audio output synchronizer for the group of audio devices 104. The first audio device 104(1) may provide synchronization commands 304 to each of the other audio devices 104, via the access point 106. Synchronization commands 304 may include commands that affect the timing, volume, or other characteristics of the processing of audio data 102 and the output of audible sound by each of the audio devices 104. For example, an audio output may be synchronized such that each audio device 104 emits corresponding portions of an audio output at the same time. Selection of the first audio device 104(1) as an audio output synchronizer may be based in part on device data 202. For example, device data 202 may indicate characteristics of the processor, clock, or other hardware or software associated with the first audio device 104(1), and corresponding characteristics of the other audio devices 104. Based on the device data 202, the first audio device 104(1) may be determined to be more suitable for generation of synchronization commands 304 than other audio devices 104. In some cases, signal quality data 204 may also at least partially determine selection of an audio output synchronizer. For example, an audio device 104 having a poor signal quality for communication with the access point 106 or with other audio devices 104 may be unsuitable for distributing synchronization commands 304 to other audio devices 104. In some implementations, an audio device 104 that functions as an audio output synchronizer may provide synchronization commands 304 to another audio device 104, which may in turn distribute the synchronization commands 304 to other audio devices 104. In other implementations, if other audio devices 104 are determined to be suitable for performing other roles or functions within the group of audio devices 104, the first audio device 104(1) may be selected as the audio output synchronizer to avoid utilizing computing resources associated with other audio devices 104.

The second audio device 104(2) may function as a receiver and distributor of control commands 302 received from the second external device 108(2). For example, an external device 108(2), such as a remote controller, may be paired with the second audio device 104(2) via a second Bluetooth communication link 110(2). The second external device 108(2) may provide control commands 302 to the second audio device 104(2), which may function as a command receiver and distributor. The second audio device 104(2) may in turn provide the control commands 302 to other audio devices 104. In some implementations, the receiver and distributor of control commands 302 may be selected based on signal quality data 204. For example, the quality of communications between the second audio device 104(2) and the external device 108(2), the access point 106, or other audio devices 104 may indicate the suitability or lack of suitability of the audio device 104(2) for receipt and transmission of control commands 302. In other cases, the receiver and distributor of control commands 302 may be determined based in part on device data 202. For example, device data 202 may indicate that a particular audio device 104 includes separate Wi-Fi and Bluetooth radios and may therefore receive control commands 302 via a Bluetooth communication link 110 without impacting the airtime or other resources available to the Wi-Fi radio. In some implementations, an audio device 104 that functions as a receiver of control commands 302 may provide the received control commands 302 to another audio device 104, which may in turn distribute the control commands 302 to other audio devices 104. In other implementations, if other audio devices 104 are determined to be suitable for performing other roles or functions within the group of audio devices 104, the second audio device 104(2) may be selected as the receiver and distributor of control commands 302 to avoid utilizing computing resources associated with other audio devices 104.

FIG. 3 depicts the fourth audio device 104(4) functioning as a receiver of audio data 102. For example, the first external device 108(1) may transmit audio data 102 to the fourth audio device 104(4) via a Bluetooth communication link 110(1). FIG. 3 also depicts the third audio device 104(3) functioning as an audio distribution master device. For example, the fourth audio device 104(4) may provide the received audio data 102 to the third audio device 104(3). The third audio device 104(3) may in turn distribute the audio data 102 to the other audio devices 104. Selection of the third audio device 104(3) as the audio distribution master device may be performed based in part on communication data 206. For example, the communication data 206 may indicate that the fourth audio device 104(4) maintains a communication link 110(1) with the first external device 108(1) that is currently exchanging data. The communication data 206 may also indicate that the second audio device 104(2) maintains a communication link 110(2) with the second external device 108(2) that is currently exchanging data. The communication data 206 may additionally indicate that the first audio device 104(1) and the third audio device 104(3) are not currently maintaining communication links 110 with any external devices 108. Based on the communication data 206, it may be determined that no airtime or other resources associated with the first audio device 104(1) or the third audio device 104(3) are currently being consumed through use of a communication link 110, and no communication links 110 are currently established that may consume the resources of the first audio device 104(1) or the third audio device 104(3). Signal quality data 204 associated with the first audio device 104(1) and the third audio device 104(3) may indicate that the quality of communications between the third audio device 104(3) and the access point 106 or between the third audio device 104(3) and the other audio devices 104 are greater than the quality of communications associated with the first audio device 104(1). Based on these determinations, the third audio device 104(3) may be selected as the audio distribution master device. In other implementations, selection of the audio distribution master device may be determined based in part on device data 202, signal quality data 204, and communication data 206. Device data 202, signal quality data 204, and communication data 206 may similarly indicate characteristics associated with each of the audio devices 104. Each characteristic may be associated with a weight factor which may be used to determine a value indicative of the suitability of each audio device 104 for use as an audio distribution master device. For example, the signal quality data 204 may indicate a signal strength associated with communications between the third audio device 104(3) and the access point 106 that exceeds the signal strength for each other audio device 104. This may indicate that the third audio device 104(3) is more suitable than the other audio devices 104 for transmitting the audio data 102 to multiple other audio devices 104 via the access point 106. The device data 202 may indicate that the third audio device 104(3) includes hardware or software components that reduce the airtime used to provide audio data 102 to other audio devices 104. The communication data 206 may indicate a lack of communication links 110 between the third audio device 104(3) and external devices 108. Each of the signal quality data 204, device data 202, and communication data 206 may therefore increase the value indicative of the suitability of the third audio device 104(3) for use as the audio distribution master device.

The fourth audio device 104(4) may be selected as the audio data receiver based in part on one or more of signal quality data 204, device data 202, or communication data 206. For example, if no other device maintains a communication link 110 with a source of audio data 102, the fourth audio device 104(4) may be selected for this function by default. As another example, the quality of communications between the fourth audio device 104(4) and the audio distribution master device may cause the fourth audio device 104(4) to be prioritized for selection as the audio data receiver.

Figure 4:
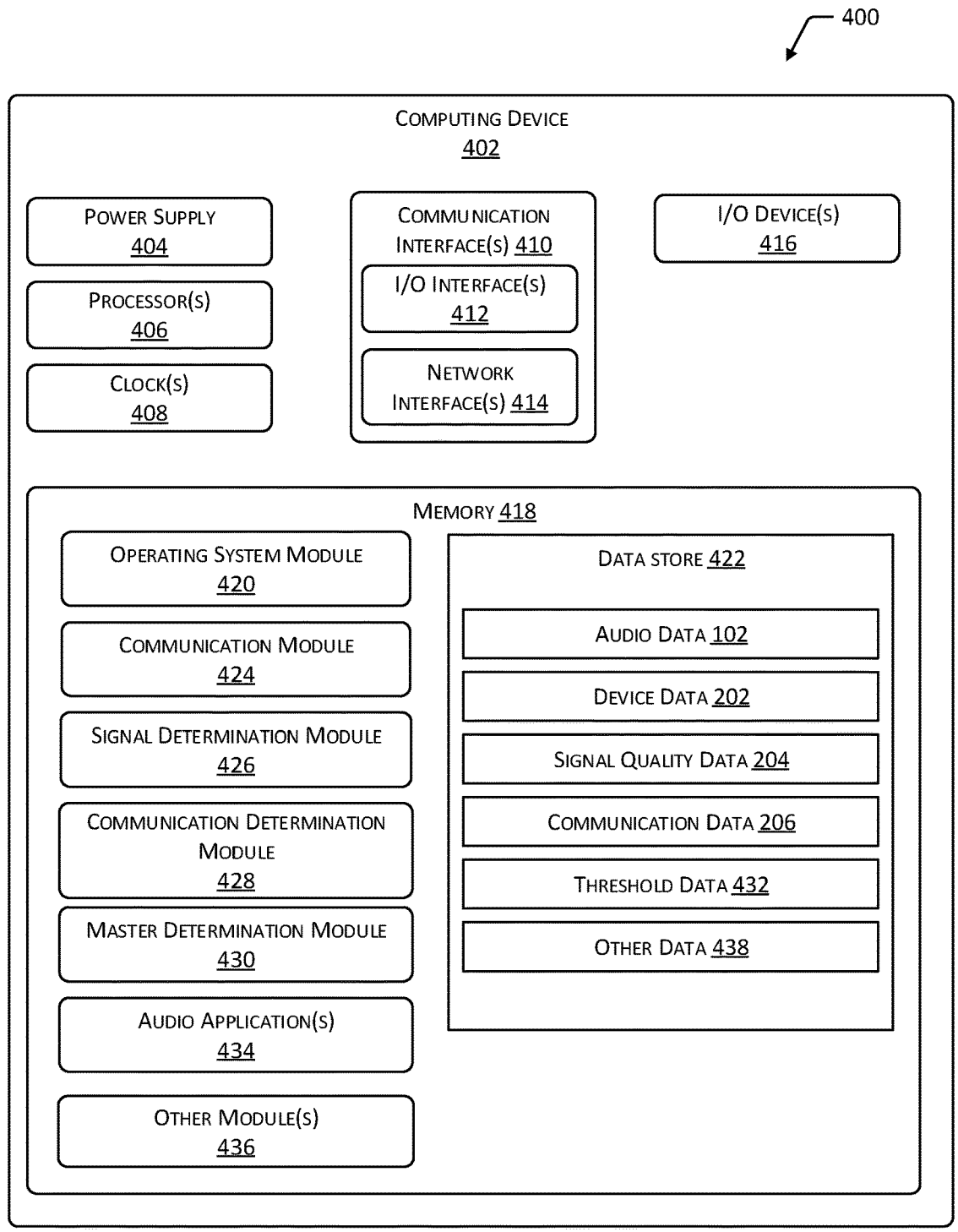
FIG. 4 is a block diagram depicting one implementation of a computing device within the scope of the present disclosure.

FIG. 4 is a block diagram 400 depicting one implementation of a computing device 402 within the scope of the present disclosure. The computing device 402 may include, without limitation, any of the devices depicted in FIG. 1, such as an audio device 104, an external device 108, or another computing device 402 in communication with one or more audio devices 104, such as a server. Additionally, while FIG. 4 depicts a single block diagram 400, the illustrated computing device 402 may include multiple computing devices 402 that independently or collaboratively perform the functions described herein. For example, multiple audio devices 104 or other computing devices 402 in communication therewith may perform the functions of the depicted computing device 402.

The computing device 402 may include one or more power supplies 404 configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, determine synchronization commands 304 to control the timing of audio output, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with audio devices 104 and other computing devices 402 or components thereof. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the computing device 402 or with another computing device 402 in communication therewith. For example, I/O devices 416 may include touch sensors, keyboards, mouse devices, microphones, image sensors (e.g., cameras), scanners, displays, speakers, haptic devices, printers, motion sensors, location sensors, and so forth. In some implementations, I/O devices 416 may include multicast transmitters and receivers. The I/O devices 416 may be physically incorporated with a computing device 402 or may be externally placed.

The network interfaces 414 may be configured to provide communications between the computing device 402 and other devices, such as the I/O devices 416, routers, access points 106, and so forth. The network interfaces 414 may include devices configured to couple to one or more networks including local area networks (LANs), wireless LANs (WLANs), wide area networks (WANs), wireless WANs (WWANs), and so forth. For example, the network interfaces 414 may include computing devices 402 compatible with Ethernet, Wi-Fi, Wi-Fi Direct, Bluetooth, Bluetooth Low Energy, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 422 and one or more of the following modules may also be stored in the memory 418. The modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including other computing devices 402, network attached storage devices, and so forth.

A communication module 424 stored in the memory 418 may be configured to establish communications with audio devices 104, servers, external devices 108, or other computing devices 402.

The memory 418 may also store a signal determination module 426. The signal determination module 426 may cause the computing device 402 to determine one or more measurements of signal strength, quality, or other characteristics of communication with other computing devices 402. For example, the signal determination module 426 may determine signal quality data 204 associated with communications with other computing devices 402. Signal quality data 204 may include RSSI measurements, SNR measurements, PER measurements, MCS values, data throughput values, bit rates, airtime utilization measurements, and so forth. In some implementations, the signal determination module 426 may determine one or more average values based on the signal quality data 204. For example, the signal determination module 426 may determine a mean RSSI value for a particular audio device 104 based on a selected count of previous RSSI measurements, such as the most recent ten RSSI measurements. The signal determination module 426 may also cause the computing device 402 to provide determined signal quality data 204 to other computing devices 402, and to receive determined signal quality data 204 from other computing devices 402. For example, multiple audio devices 104 within a group of audio devices 104 may receive signal quality data 204 from each audio device 104 within the group, and in some implementations, from the access point(s) 106. The signal quality data 204 may be used to determine particular functions for the audio devices 104, such as the selection of an audio distribution master device.

In some implementations, the signal determination module 426 may determine a bit rate associated with the transmission of data between audio devices 104 by providing data from a particular audio device 104 to other audio devices 104. The signal determination module 426 may determine the bit rate based on the quantity of data that is provided during a period of time. In other implementations, a bit rate may be determined based on a determined RSSI value or another value associated with the signal quality data 204. In some cases, the signal determination module 426 may determine bit rate values for audio devices 104 both directly through the actual transmission of data and indirectly based on RSSI or other signal quality values.

The memory 418 may also store a communication determination module 428. The communication determination module 428 may determine communication data 206 associated with various audio devices 104. Communication data 206 may indicate the presence or absence of communication links 110 between an audio device 104 and other devices. The communication data 206 may also indicate the status of one or more of the communication links 110. For example, the communication data 206 may indicate that a particular audio device 104 is incapable of initiating communication links 110 with external devices 108. The communication data 206 may indicate that a particular audio device 104 is capable of initiating communication links 110, but that no communication links 110 have currently been initiated. The communication data 206 may indicate that an audio device 104 has initiated communication links 110 with one or more external devices 108, but that the external device(s) 108 are currently out of range, deactivated, or otherwise not detectable. The communication data 206 may indicate that an audio device 104 has initiated communication links 110 within one or more external devices 108 that are currently within range or otherwise detectable. The communication data 206 may indicate that an audio device 104 is currently exchanging data with another device via one or more communication links 110.

The memory 418 may also store a master determination module 430. The master determination module 430 may determine a particular audio device 104 to function as an audio distribution master device based on one or more of the device data 202, signal quality data 204, or communication data 206, which, as described with regard to FIGS. 1-3, may indicate one or more characteristics of one or more of the audio devices 104. In some implementations, the master determination module 430 may determine correspondence between one or more of the device data 202, signal quality data 204, or communication data 206, with threshold data 432. For example, threshold data 432 may indicate a minimum signal quality measurement associated with communication between a master device and an access point 106. As another example, threshold data 432 may indicate a maximum count of communication links 110 with external devices 108 maintained by a master device. As yet another example, threshold data 432 may indicate a maximum count of active communication links 110 that are currently exchanging data with an external device 108 that may be maintained by a master device. In some implementations, the maximum count of communication links 110 that are currently exchanging data may be zero. The threshold data 432 may also include one or more rules or algorithms regarding weights applied to one or more of the device data 202, signal quality data 204, or communication data 206. For example, a particular audio device 104 may be prioritized for selection as an audio distribution master device based on the communication data 206 indicating a lack of communication links 110 between that audio device 104 and any external devices 108. However, signal quality data 204 may indicate that the particular audio device 104 exhibits poor signal strength when communicating with an access point 106, while a different audio device 104, that is paired with an external device 108 via a Bluetooth communication link 110, exhibits a superior signal strength measurement. In some cases, based on weights indicated in the threshold data 432, the latter audio device 104 may be selected as the audio distribution master device. For example, a value indicative of the suitability of each audio device 104 for use as an audio distribution master device may be determined based on one or more of the threshold data 432, the device data 202, the signal quality data 204, or the communication data 206.

In some implementations, the master determination module 430 may determine an audio distribution master device periodically. For example, one or more of the device data 202, signal quality data 204, or communication data 206 may change over time. Continuing the example, a user may reconfigure an audio device 104 or install new hardware or software, changing the device data 202. As another example, a user may change the location of an audio device 104 or other objects proximate to an audio device 104, or network conditions may change, resulting in one or more changes to the signal quality data 204. As yet another example, an audio device 104 may initiate one or more new communication links 110, terminate existing communication links 110, begin exchanging data using a communication link 110, an external device 108 may become undetectable or detectable, and so forth. This may result in a change in the communication data 206. In some cases, a change in one or more of device data 202, signal quality data 204, or communication data 206 may result in selection of a different audio device 104 as an audio distribution master device.

The memory 418 may additionally store one or more audio applications 434. Audio applications 434 may process audio data 102 to generate an audio output. In some implementations, the audio applications 434 may control a timing of an audio output, a volume of an audio output, or other characteristics of the audio output. For example, an audio application 434 may be used to generate a surround-sound output or another type of synchronized output using multiple audio devices 104, such as by determining particular portions or channels of audio data 102 to be processed and output using particular audio devices 104.

Other modules 436 may include modules for determining other functions of particular audio devices 104, such as an audio output synchronizer, a command receiver and distributor, or an audio data receiver. The particular roles and functions of various audio devices 104 may be determined based on one or more of the device data 202, signal quality data 204, or communication data 206, and the threshold data 432. Other modules 436 may also include encryption modules that may be used to encrypt and decrypt communications between computing devices 402. The other modules 436 may also include modules for receiving user input to configure parameters of audio devices 104, set threshold values of the threshold data 432, and so forth. In some cases, user input may be used to determine one or more roles or functions of audio devices 104 independent of the signal quality data 204, device data 202, or communication data 206. Other modules 246 may further include location modules that may be used to determine the location of particular audio devices 104 relative to other audio devices 104 or access points 106. In some implementations, the locations of other audio devices 104 may be determined based on device data 202. For example, the device data 202 may include data indicative of the current location of an audio device 104. In other implementations, the locations of audio devices 104 may be determined using a radio navigation-based system, such as a Global Positioning System (GPS) receiver, or other terrestrial or satellite-based navigational systems. In still other implementations, the locations of audio devices 104 may be determined using one or more device sensors or other I/O devices 416.

Other data 438 within the data store 422 may include user input data, such as configurations and settings associated with computing devices 402. Other data 438 may also include security data, such as encryption keys and schema, access credentials, and so forth. Other data 438 may additionally include rules, algorithms, and so forth, used to synchronize and control audio output, such as by determining time delays between the emissions of sounds based on the locations of audio devices 104.

In different implementations, different computing devices 402 may have different capabilities or capacities. For example, servers may have significantly more processor 406 capability and memory 418 capacity compared to the processor 406 capability and memory 418 capacity of audio devices 104.

Figure 5:
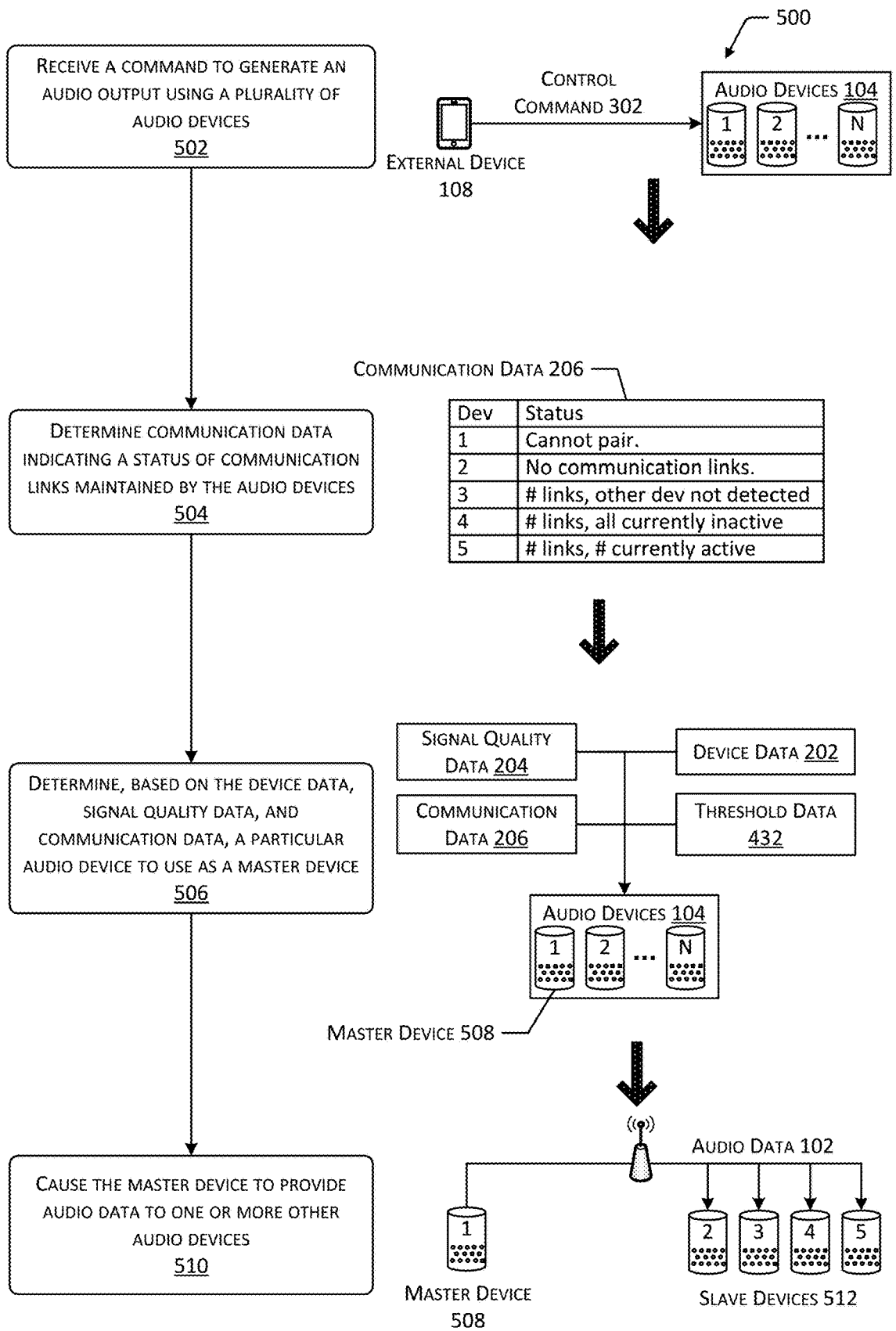
FIG. 5 depicts a scenario illustrating a method for determining a particular audio device for use as an audio distribution master device.

FIG. 5 depicts a scenario 500 illustrating a method for determining a particular audio device 104 for use as an audio distribution master device. At 502, a command to generate an audio output using a plurality of audio devices 104 may be received. For example, an external device 108 may provide a control command 302 to one or more of the audio devices 104 within a group of audio devices 104. As described with regard to FIG. 3, in some implementations, a single audio device 104 may receive control commands 302 from an external device 108 and provide the control commands 302 to other audio devices 104, such as via one or more access points 106. In some implementations, a control command 302 may indicate particular audio data 102 to be used to generate an output, particular audio devices 104 or groups of audio devices 104, one or more particular audio applications 434 to generate the output, and so forth. Additionally, a control command 302 may include one or more characteristics of the audio output, such as a volume, a directional component, or other characteristics of emitted sound.

At 504, communication data 206 indicating a status of communication links 110 maintained by the audio devices 104 may be determined. As described with regard to FIGS. 1-3, audio devices 104 that are currently exchanging data with other devices via a communication link 110 may be constrained regarding the ability of those audio devices 104 to function as an audio distribution master device. For example, receipt of data via a Bluetooth communication link 110 may consume airtime or other resources associated with an audio device 104. The reduced resources available to that audio device 104 may be insufficient for the audio device 104 to provide the audio data 102 to each other audio device 104 within the group of audio devices 104.

FIG. 5 depicts example communication data 206 indicating the status of communication links 110 for five audio devices 104. A first audio device 104 may be unable to pair with other devices via a communication link 110. A second audio device 104 may be able to pair with other devices, but may currently not be maintaining any communication links 110. A third audio device 104 may currently maintain one or more communication links 110, but the device with which the communication links 110 are maintained may not currently be detectable. For example, the other device may be out of range, deactivated, and so forth. A fourth audio device 104 may currently maintain one or more communication links 110 with a device that is currently detectable, but may not currently be exchanging data with other devices via the communication links 110. A fifth audio device 104 may currently be actively exchanging data via one or more communication links 110.

At 506, a particular audio device 104 to use as a master device 508 may be determined, based on device data 202, signal quality data 204, and communication data 206. For example, as described with regard to FIG. 4, correspondence may be determined between one or more of the device data 202, signal quality data 204, and communication data 206 and threshold data 432. The threshold data 432 may indicate minimum or maximum measurements of signal quality, particular characteristics of audio devices 104, particular characteristics of communication links 110, and so forth. In some implementations, the threshold data 432 may include one or more rules, algorithms, weights, and so forth, that may be used to prioritize particular audio devices 104 for use as a master device 508 based on the correspondence between the threshold data 432 and the device data 202, signal quality data 204, and communication data 206. FIG. 5 depicts a selection of the first audio device 104 as a master device 508 based on the communication data 206. For example, the inability of the first audio device 104 to initiate communication links 110 with external devices 108 may prevent the utilization of airtime or other resources associated with the first audio device 104.

At 510, the master device 508 may provide audio data 102 to one or more other audio devices 104. For example, after a master device 508 has been determined, each other audio device 104 within a group of audio devices 104 may function as a slave device 512 that receives audio data 102 from the master device 508 via a connection to an access point 106. In other implementations, the master device 508 may provide audio data 102 to one or more slave devices 512 via a multicast transmission. In some cases, the device data 202 may indicate the ability, or lack thereof, of particular audio devices 104 to transmit or receive data via a multicast. For example, an audio device 104 that may transmit audio data 102 via a multicast transmission may be prioritized for use as a master device 508 over an audio device 104 that lacks this capability.

In some implementations, the master device 508 may be determined without first receiving a control command 302 at 502. For example, based on one or more of signal quality data 204, device data 202, or communication data 206 associated with a group of audio devices 104, a particular audio device 104 suitable for use as a master device 508 may be determined in the absence of a control command 302. If a control command 302 is subsequently received, the previously-determined master device 508 may begin to distribute audio data 102 to other audio devices 104 without requiring a determination of the master device 508 to be made responsive to the control command 302.

Figure 6:
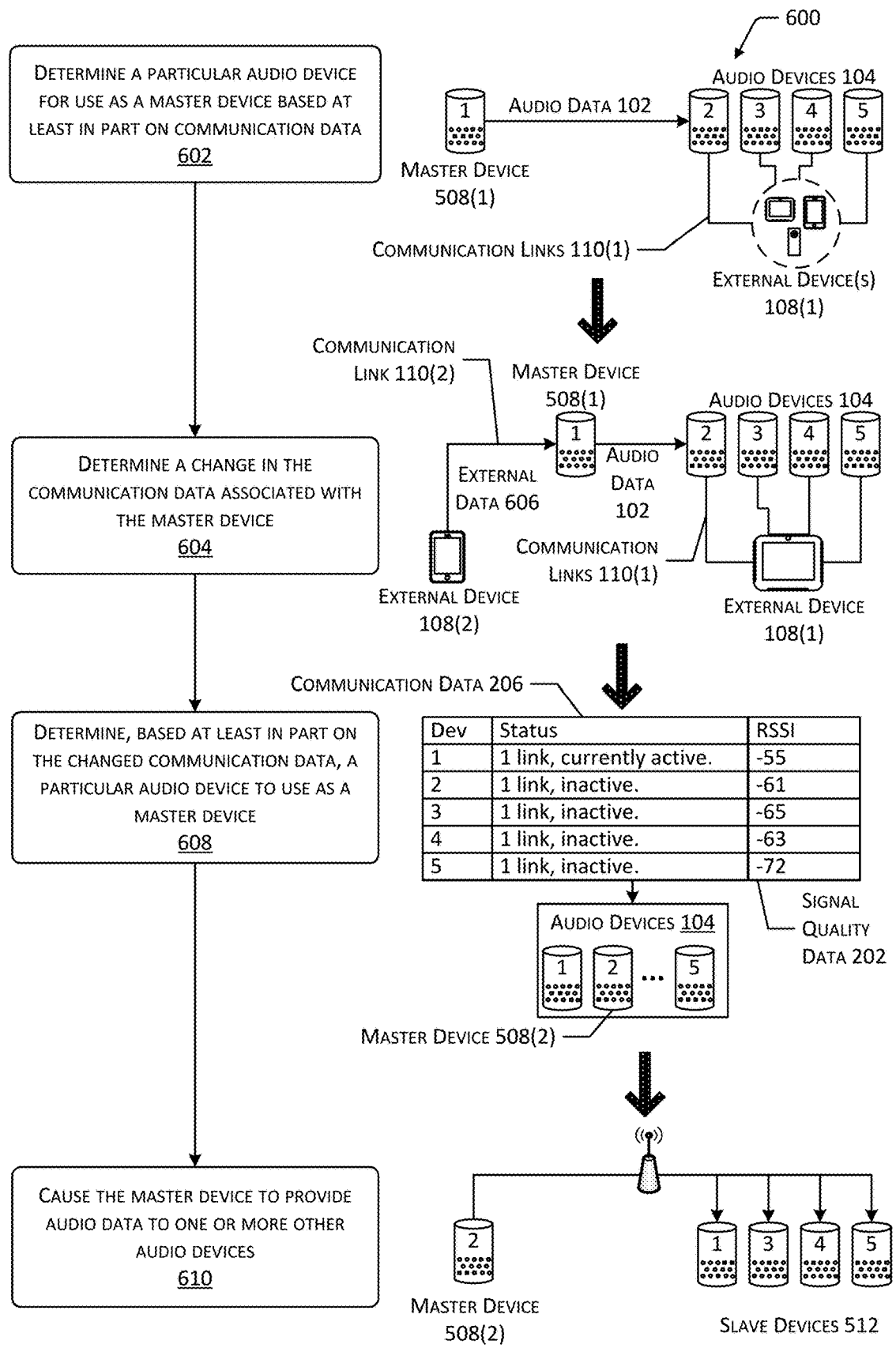
FIG. 6 depicts a scenario illustrating a method for modifying a selection of a master device based on communications data.

FIG. 6 depicts a scenario 600 illustrating a method for modifying a selection of a master device 508 based on communication data 206. At 602, a particular audio device 104 for use as a master device 508(1) may be determined based at least in part on communication data 206. One method by which a master device 508(1) may be determined is described with regard to FIG. 5. For example, audio devices 104 lacking active communication links 110 may be prioritized over audio devices 104 that are actively exchanging data with external devices 108. Continuing the example, audio devices lacking communication links 110 may be prioritized over audio devices 104 that are paired with one or more external devices 108. In the scenario 600 of FIG. 6, four audio devices 104 are shown maintaining communication links 110(1) with external devices 108(1), while the master device 508(1) lacks a communication link 110 with an external device 108.

At 604, a change in the communication data 206 associated with the master device 508(1) may be determined. For example, the master device 508(1) may initiate a new communication link 110(2) with an external device 108(2). As another example, a master device 508(1) may begin exchanging data using a preexisting communication link 110. In the example scenario 600 of FIG. 6, an external device 108(2) is shown establishing a communication link 108(2) with the master device 508(1) and transmitting external data 606 to the master device 508(1). In some cases, the external data 606 may include audio data 102. In other cases, the external data 606 may include other commands or configuration data for the master device 508(1), or data unrelated to the generation of audio output.

At 608, based at least in part on the changed communication data 206, a particular audio device 104 may be selected for use as a master device 508(2). Depending on the communication data 206 associated with each audio device 104, the particular audio device 104 may be the same audio device 104 previously used as a master device 508, or a different audio device 104. For example, one or more of the other audio devices 104 that maintain communication links 110(1) with one or more of the external device(s) 108(1) may not currently be exchanging data with the external device(s) 108(1). However, the exchange of data between the master device 508(1) and the second external device 108(2) may consume airtime or other resources associated with the master device 508(1), constraining the ability of the master device 508(1) to provide audio data 102 to the other audio devices 104. Therefore, one of the other audio devices 104 may be prioritized for use as a master device 508 over the current master device 508(1). In the example scenario 600 of FIG. 6, each of the other audio devices 104 maintains a single communication link 110(1) with an external device 108(1). Therefore, the determination of the second master device 508(2) may also be based at least in part on other data, such as signal quality data 204. For example, the second master device 508(2) may include the audio device 104 having the greatest RSSI measurement for communications with the access point 106. At 610, the second master device 508(2) may provide audio data 102 to the other audio devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a plurality of audio devices;
   one or more memories storing computer-executable instructions; and
   one or more hardware processors to execute the computer-executable instructions to:
   receive a command to output synchronized audio using the plurality of audio devices;
   determine first signal quality data indicative of a quality of communication between a first audio device of the plurality of audio devices and a first subset of the plurality of audio devices, the first subset not including the first audio device;
   determine first device data indicative of one or more characteristics of a first wireless radio associated with the first audio device;
   determine first communication data indicative of one or more connections between the first audio device and one or more other devices via a Bluetooth communication link, the one or more other devices being different from the plurality of audio devices;
   receive audio data at the first audio device from the one or more other devices via the Bluetooth communication link;
   determine second signal quality data indicative of a quality of communication between a second audio device of the plurality of audio devices and a second subset of the plurality of audio devices, the second subset being a subset of the first subset and not including the second audio device;
   determine second device data indicative of one or more characteristics of a second wireless radio of the second audio device;
   determine second communication data indicative of a lack of connection between the second audio device and the one or more other devices via Bluetooth communication links;
   determine third communication data indicative of an exchange of data between the second audio device and the one or more other devices via the Bluetooth communication links;
   based at least in part on the first communication data, the second communication data, and the third communication data, provide the audio data from the first audio device to the second audio device; and
   cause the second audio device to provide the audio data to the second subset of the plurality of audio devices.

2. The system of claim 1, wherein the second communication data indicates a second communication link between the second audio device and a third device.

3. The system of claim 1, wherein the second device data further indicates that the second audio device is capable of providing data to at least two audio devices in the second subset of the plurality of audio devices via a multicast transmission and the second audio device provides the audio data to the at least two audio devices in the second subset via multicast transmission.

4. The system of claim 1, wherein the first communication data indicates a Bluetooth communication link between the first audio device and at least one other device that has not exchanged data between the first audio device and the at least one other device for at least a threshold length of time.

5. A method comprising:
   determining first communication data associated with a first device of a plurality of devices, wherein the first communication data indicates that the first device is currently not outputting audio data;
   determining second communication data associated with a second device from a first subset of the plurality of devices, wherein the second communication data indicates that the second device is communicatively coupled to a third device;
   based at least in part on the first communication data and the second communication data, providing audio data from a fourth device to the first device; and
   causing the first device to provide the audio data to the second device.

6. The method of claim 5, further comprising:
   determining first signal quality data indicative of a first quality of communication between the first device and the first subset of the plurality of devices;
   determining second signal quality data indicative of a second quality of communication between the second device and a second subset of the plurality of devices, the second subset being a subset of the first subset and not including the second device; and
   determining that the first quality of communication is greater than the second quality of communication.

7. The method of claim 5, further comprising:
   based on the first communication data, determining a first amount of resources associated with communication of the first communication data by the first device;
   based on the second communication data, determining a second amount of resources associated with communication of the second communication data by the second device; and
   determining the first amount of resources to be less than the second amount of resources; and
   wherein causing the first device to provide the audio data to the second device is based on the first amount of resources being less than the second amount of resources.

8. The method of claim 5, wherein:
   the second communication data indicates that the second device is paired with at least one other device via a communication link.

9. The method of claim 5, further comprising:
   causing the second device to receive the audio data via a communication link with a source of the audio data; and
   causing the second device to provide the audio data to the first device.

10. The method of claim 5, further comprising:
determining device data associated with the first device, wherein the device data indicates that the first device is configured to provide audio data to a second subset of the plurality of devices via a multicast transmission;
wherein the audio data is provided to the first device further based at least in part on the device data.

11. The method of claim 5, further comprising:
determining a change in the first communication data to form third communication data, wherein the third communication data indicates one of: initiation of a communication link between the first device and at least one other device or initiation of an exchange of data via an existing communication link between the first device and the at least one other device;
based at least in part on the first communication data, providing the audio data to the second device; and
causing the second device to provide the audio data to a second subset of the plurality of devices.

12. The method of claim 5, wherein the first communication data indicates a first communication link between the first device and a fifth device and the second communication data indicates a second communication link between the second device and third device, the method further comprising:
determining, based on the first communication data, one or more of a first device type or a first communication history associated with the third device;
determining, based on the second communication data, one or more of a second device type or a second communication history associated with the fourth device; and
determining one or more of a frequency or a quantity of communication data associated with the one or more of the second device type or the second communication history to exceed one or more of a frequency or a quantity of communication data associated with the one or more of the first device type or the first communication history.

13. The method of claim 5, further comprising:
determining, based on device data associated with the second device, that the second device is configured to cause a second subset of the plurality of devices to control a timing of an audio output;
wherein the audio data is provided to the first device further based at least in part on the device data.

14. A system comprising:
one or more memories storing computer-executable instructions; and
one or more hardware processors to execute the computer-executable instructions to:
determine first communication data associated with a first device of a plurality of devices, wherein the first communication data is indicative of the first device currently not outputting audio data;
determine second communication data associated with a second device from a first subset of the plurality of devices, wherein the second communication data is indicative of the second device being communicatively coupled to a third device;
based on the first communication data, determine a first amount of resources associated with communication of the first communication data;
based on second communication data, determine a second amount of resources associated with communication of the second communication data;
determine that the first amount of resources are less than the second amount of resources;
cause audio data to be provided to the first device;
cause the first device to provide the audio data to a second device in a first subset of the plurality of devices; and
determine a second subset of the plurality of devices, the second subset being a subset of the first subset and not including the second device; and
cause the second device to provide the audio data to the second subset of the plurality of devices.

15. The system of claim 14, further comprising computer-executable instructions to:
cause the second device to receive the audio data from a source; and
cause the second device to provide the audio data to the first device.

16. The system of claim 14, further comprising computer-executable instructions to:
determine first signal quality data indicative of a first quality of communication between the first device and the first subset of the plurality of devices;
determine second signal quality data indicative of a second quality of communication between the second device and the second subset of the plurality of devices; and
determine that the first quality of communication is greater than the second quality of communication.

17. The system of claim 14, further comprising computer-executable instructions to:
determine a first device type associated with the first device;
determine a second device type associated with the second device;
determine the first amount of resources based at least in part on the first device type; and
determine the second amount of resources based at least in part on the second device type.

18. The system of claim 14, wherein the computer-executable instructions to cause the first device to provide the audio data to the second device of the plurality of devices include computer-executable instructions to: cause the first device to provide the audio data to the second device of the plurality of devices via a multicast transmission.

19. The system of claim 14, further comprising computer-executable instructions to:
determine a change in one or more of the first communication data or the second communication data, wherein the change causes the first amount of resources to exceed the second amount of resources;
provide the audio data to the second device; and
cause the second device to provide the audio data to the second subset of the plurality of devices.

20. The system of claim 14, further comprising computer-executable instructions to:
determine a change in the first communication data indicative of initiation of one or more communication links with one or more other devices;
provide the audio data to the second device; and
cause the second device to provide the audio data to the second subset of the plurality of devices.

* * * * *

UNITED STATES PATENT AND TRADEMARK OFFICE
CERTIFICATE OF CORRECTION

PATENT NO. : 10,524,069 B1
APPLICATION NO. : 15/387158
DATED : December 31, 2019
INVENTOR(S) : Michael Alan Pogue It is certified that error appears in the above-identified patent and that said Letters Patent is hereby corrected as shown below:

In the Claims

Column 22, Claim 14, Line 1:
Currently Reads: based on second communication data, determine a Where it should read: --based on the second communication data, determine a--

Column 22, Claim 14, Lines 7-8:
Currently Reads: cause the first device to provide the audio data to a second device in a first subset of the plurality of Where it should read: --cause the first device to provide the audio data to the second device in the first subset of the plurality of--

Signed and Sealed this
Eighteenth Day of February, 2020

Andrei Iancu
*Director of the United States Patent and Trademark Office*